United States Patent [19]

Moufarrege

[11] Patent Number: 4,624,815
[45] Date of Patent: Nov. 25, 1986

[54] PROCESS OF PRODUCING MOSAIC ARTICLES

[76] Inventor: Michael N. Moufarrege, 1573 Elmwood Ave., Rochester, N.Y. 14620

[21] Appl. No.: 711,007

[22] Filed: Mar. 12, 1985

[51] Int. Cl.⁴ .................. B28B 11/08; B29C 39/12; B32B 3/14; B32B 31/06
[52] U.S. Cl. .................................. 264/162; 264/246; 264/247; 264/255; 264/256; 264/261; 264/271.1; 428/45; 428/49
[58] Field of Search ............ 264/122, 128, 261, 271.1, 264/74, 162, 246, 247, 255, 256; 428/45, 49

[56] References Cited

U.S. PATENT DOCUMENTS

| | | | |
|---|---|---|---|
| 3,070,866 | 1/1963 | Kastenbein | 249/189 |
| 3,349,158 | 10/1967 | Maynard | 264/261 |
| 4,466,937 | 8/1984 | Johnston | 264/333 |

Primary Examiner—Donald Czaja
Assistant Examiner—Leo B. Tentoni
Attorney, Agent, or Firm—Charles S. McGuire

[57] ABSTRACT

A process of making slabs for use as table tops, or other decorative purposes, comprising an array of individual stones arranged in mosaic patterns. A base of hard, essentially nonwarping wood is cut to the desired outline of the final slab and supported on a spacer member in a horizontal position above the level of a work surface. Border stones are placed upon the work surface to extend upwardly therefrom a predetermined, uniform distance essentially even with the surface of the base about the periphery thereof, and mosaic stones are arranged in a desired pattern within the border stones. A flexible constraining member is placed about the border stones and a layer of polyester resin in liquid state is poured over the mosaic and border stones to fill the interstices and to bond the stones to the wood base. After the resin hardens the exposed surfaces of the stones are polished and excess resin removed by buffing. The slab is inverted and the opposite surface is covered with resin to the level of the border stones, either before or after the polishing of the top surface. At least some of the stones are preferably shaped along edge portions thereof to provide an overlap of adjacent stones, giving added lateral stability.

10 Claims, 8 Drawing Figures

PROCESS OF PRODUCING MOSAIC ARTICLES

BACKGROUND OF THE INVENTION

The present invention relates to processes of fabricating flat slabs having a decorative surface of semi-precious stones arranged in a mosaic pattern, and more particularly to novel methods of producing mosaic articles in the form of attractive, durable, flat slabs.

The art of mosaic decoration has been practised for centuries, consisting in surface decorations made by inlaying small pieces of variously colored material to form pictures or patterns. The mosaic pieces are usually stone or ceramic, which may be naturally or artifically colored and bonded to the surface upon which the pattern is formed by glue, grouting, or other appropriate material. Surface decorations are provided on building structures, walkways, table tops and other items of furniture, as well as on non-utilitarian, decorative objects. Many mosaic creations are highly valued for their artistic achievement.

It is a principal object of the present invention to provide a novel and improved process for producing flat slabs having a mosaic pattern on one surface, and which are of relatively light weight, yet sturdy and non-warping.

Another object is to produce flat slabs having artistic and decorative patterns on one surface made up of a plurality of initially separate stones which are formed to resist lateral movement without detracting from the appearance of the finished surface.

A further object is to provide a novel method of fabricating mosaic slabs, which may have both decorative and utilitarian purposes which have long life due to high dimensional stability, and resistance to breakage and discoloration, particularly due to exposure to direct sunlight.

Other objects will in part be obvious and will in part appear hereinafter.

SUMMARY OF THE INVENTION

The process of the present invention involves, as an initial step, forming a flat wooden base member in substantially the desired peripheral shape of the finished article. The base member is then supported in a horizontal position in spaced relation to a work surface by a spacer member or members which does not extend outside the perimeter of the base member. The mosaic materials, preferably semi-precious stones of various colors, are cut as necessary to the desired size, shape and thickness and include so-called border stones as well as the stones forming the mosaic pattern.

The border stones are cut to a shape complementary to that of the wooden base member so that they may be arranged in contacting or closely spaced relation to the base and to one another about the entire periphery. The thickness of the border stones is such that they extend from lower surfaces resting upon the work surface to upper surfaces in the plane of the upper surface of the base member. The stones forming the mosaic pattern are then manually arranged in the desired pattern upon the surface of the base member, substantially filling the area defined by the base and the border stones, but having a relatively small clearance between at least some of the mosaic stones.

A flexible member of wood, metal or plastic is placed around the border stones and the mosaic stones overlying the border stones, in close contact therewith and secured in such position. A polyester resin in liquid form is then poured over the surface of the mosaic stones and flows into the spaces therebetween, as well as into any spaces between the border stones, flowing outwardly to the extent permitted by the flexible retaining member. Some of the resin also seeps between the mosaic stones and the surface of the base member. The resin is allowed to dry and harden for an appropriate time, after which the slab is inverted to expose what was originally the lower surface of the wooden base member, surrounded by the border stones and flexible retaining member. The recess thus defined is filled with the same polyester resin, which fills any gaps between border stones on this side of the slab, and is allowed to dry and harden. The flexible member is then removed and the mosaic surface and side edges polished to remove any excess resin and to enhance the appearance of the stones, and the opposite surface is ground essentially flat.

DETAILED DESCRIPTION

Figure 1:
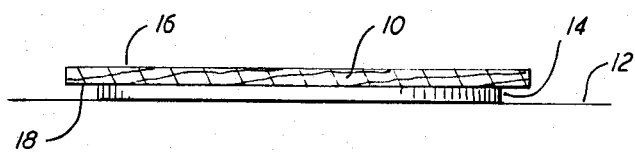
FIG. 1 is an elevational view in vertical section of an element of the mosaic slab in an initial step of the process of fabrication thereof.

Referring now to the drawings, in FIG. 1 is shown base member 10, comprised of a flat layer of wood, supported in spaced relation to a horizontal work surface 12 by support member 14. Wooden base member 10 is cut to a peripheral outline conforming to that of the finished slab, which may be any desired regular geometric or irregular shape with essentially flat, parallel surfaces which, when supported in the position of FIG. 1, comprise upper and lower surfaces 16 and 18, respectively. It is essential to the finished product that base member 10 be of high dimensional stability, i.e., non-warping, and therefore substantially moisture-proof. For larger pieces, for example, those having a maximum transverse dimension of two feet or more, an extremely hard and dense wood such as Jacaranda, native to Brazil, is preferred. Although relatively expensive, such wood is substantially waterproof in its natural form and therefore requires no further treatment. For smaller pieces, less expensive, more porous woods, or pressed wood products may be used, in which case they are impregnated with resin and dried before use in the present invention to insure that no substantial warping will occur.

The materials used to form the mosaic patterns of the slabs are preferably semi-precious stones such as serpentine, alabaster, onyx and dolomite, and/or other stones or materials such as marble, quartz, agate or agatised petrified wood. Such materials, hereinafter referred to simply as stones, may be obtained in a wide variety of natural colors for relative arrangement to provide virtually any desired pattern or design. The stones are cut by a diamond saw into flat pieces which are highly polished on one surface and ground essentially flat on the other. They are gauged to an essentially uniform thickness, for example, 5 millimeters, and cut as desired into individual pieces of regular or random shapes.

Figure 2:
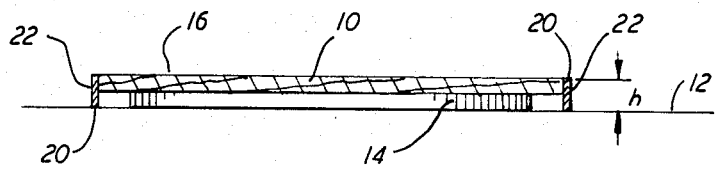
FIGS. 2–5 are sectional, elevational views, as in FIG. 1, illustrating further elements and steps in the fabrication process, FIG. 5 being only partly in section.

Some of the stones so prepared are used to form the mosaic pattern on the finished surface and others are used to form the border of the slab on the opposite surface. The so-called border stones are cut into segments of appropriate length for placement in end-to-end relationship about the entire periphery of base member 10. Two of the border stones, denoted by reference numeral 20, are seen on each side of base member 10 in FIGS. 2-5, and the lower surfaces of all border stones 20 are seen in the bottom plan view of FIG. 8. Side surfaces 22 of border stones 20 form a portion of the side edge of the finished slab and are therefore contoured to provide a continuous surface of the desired outline, such as the circular shape of the illustrated embodiment. The height of border stones 20, indicated in FIG. 2 as dimension "h" is substantially equal to the combined thickness of base member 10 and spacer 14, i.e., the height above work surface 12 of upper surface 16 of base member 10, whereby the upper edges of the border stones are substantially coplanar with surface 16.

Figure 3:
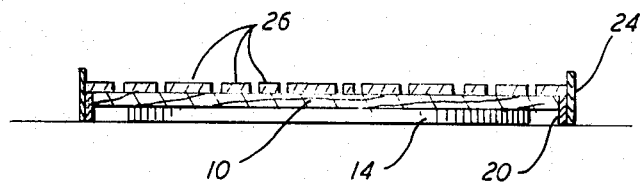

When border stones 20 have been positioned completely about the periphery of base member 10 they are surrounded by retainer member 24, a solid strip of material which forms a complete enclosure about border stones 20, in close engagement with outer surfaces 22 thereof, as shown in FIG. 3. Although retainer member 24 may be formed of a plurality of separate strips of either flexible or rigid material, it is preferred that where possible a single, continuous strip of flexible material be used which will conform to the outline of surfaces 22 of border stones 20. Such would be the case, for example, in the circular form of slab illustrated herein, while either flexible or rigid individual strips of appropriate length could be used in the case of square, rectangular, or other straight sided slabs. Retainer member 24 is releasably secured in position by any convenient means.

Mosaic stones 26, i.e., those forming the decorative mosaic pattern on the surface of the slab, are then manually placed and arranged on surface 16 with the shapes and colors of the individual stones complementing one another to provide the desired design, i.e., a picture or pattern of inlaid, multi-colored stones of various sizes and shapes. Stones 26 will normally be arranged in closely spaced relation, but there will be gaps of varying width between adjacent stones. Where larger stones of irregular outline are used, creating relatively large gaps therebetween, small stones may be used to partially fill such gaps.

When all stones have been arranged in the desired relation, a resin material in liquid form is poured over the entire upper surface. The resin flows into the gaps between adjacent mosaic stones 26, and some resin will seep between the stones and surface 16 of base 10. Also, some of the resin at the edges will flow between mosaic stones 26 and border stones 20, as well as between the border stones themselves, being constrained from flowing further outwardly by retainer member 24. A preferred material is the polyester resin sold under the trade designation Resin Solution No. UN 1866, available from Silmar Division of Sohio Corp., 12335 S. Van Ness Avenue, Hawthorne, Calif. 90250. A conventional pigment may be added, if desired, to provide opacity and resist discoloration from ultraviolet rays, particularly in applications where it is anticipated that the slabs will be exposed to direct sunlight.

In any event, the resin is sufficiently viscous at room temperature that it will flow between the adjacent mosaic stones and will seep between the mosaic stones and the upper surfaces of base 10 and border stones 20, and will maintain a level at least as high as the upper surfaces of the mosaic stones without emptying through the gaps between border stones before hardening. The resin material hardens at room temperature to provide a strong bond between adjacent stones as well as between the stones and base without warpage. The resin material between mosaic stones 26 is indicated in FIGS. 4-7 by reference numeral 28.

Figure 4:
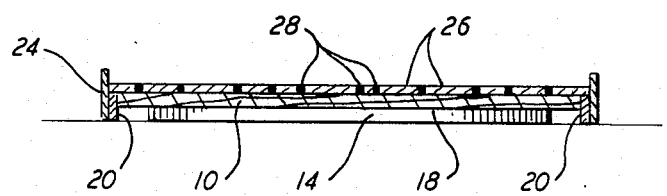

After the resin applied to the mosaic stone surface in the step illustrated in FIG. 4 has dried and hardened sufficiently, the slab is inverted and placed upon work surface 12 with the mosaic stone surface down. Surface 18 of base 10 is now the upper surface and a recess or cavity is formed by surface 18 and border stones 20 about the perimeter thereof. This recess is then entirely filled with the same resin material that was applied to the mosaic stone surface. If the gaps between border stones 20 were not filled during the application of the resin material to the mosaic stone surface sufficiently to prevent leakage therethrough, retainer member 24, although not shown in FIG. 5, may remain in position about border stones 20.

Figure 5:
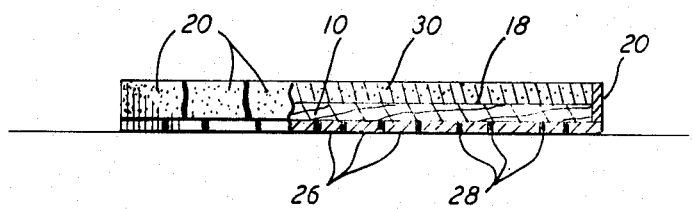
Figure 8:
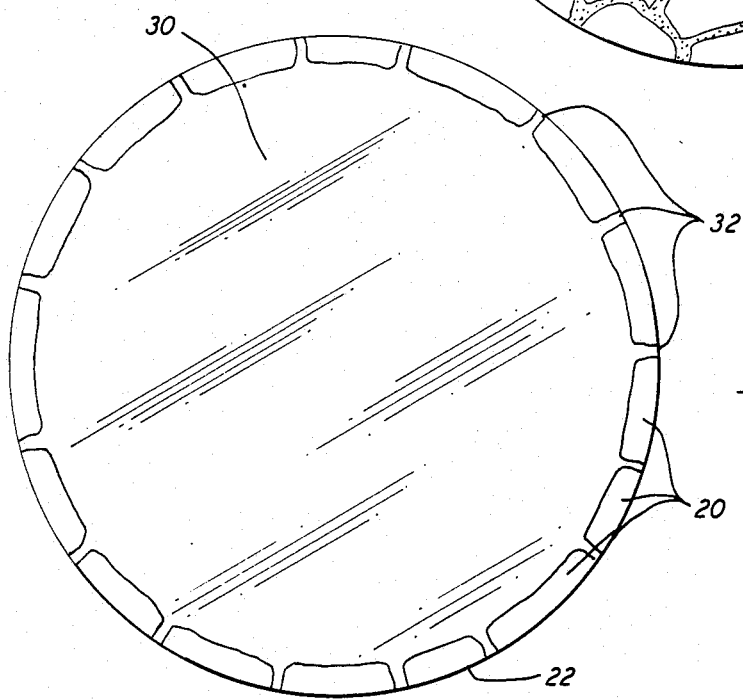

The solid layer of resin applied in the recess on the obverse side of the slab is denoted in FIGS. 5 and 8 by reference numeral 30, and the resin material between border stones 20 by reference numeral 32. After all the resin has hardened, which will occur at room temperature (the time required depending upon the specific resin material used as well as temperature and humidity conditions), the mosaic stone surface and outer surfaces 22 of border stones 20 are polished to a smooth and lustrous finish. Resin layer 30 is rough ground, if necessary, to an essentially flat surface. The resin layer will accept ordinary wood screws for mounting the finished slab upon legs, brackets, or other support means.

Figure 6:
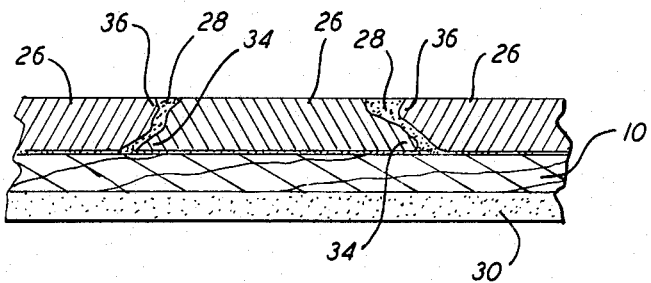
FIG. 6 is an enlarged, fragmentary, sectional, elevational view showing an additional feature.
Figure 7:
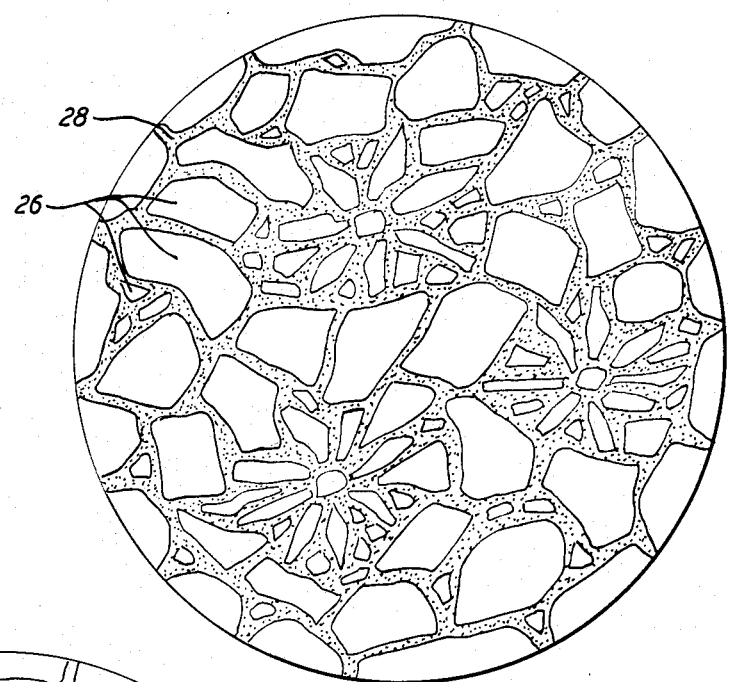
FIGS. 7 and 8 are top and bottom plan views, respectively, of an example of a slab produced according to the process of the invention.

In FIG. 6 is shown an enlarged cross section of a portion of a finished slab. It will be noted that some of the mosaic stones 26, particularly those which form the larger or more important parts of the mosaic design, have portions which overlap above and below one another at the adjacent peripheries. The edges of the stones are beveled or cut to provide overlapped portions 34 and 36 which permits the stones to be in essentially abutting relation at their lower edges while having some space therebetween which is filled by epoxy layer 28 adjacent their upper, or visible surfaces in the finished slab. This arrangement tends to prevent any shifting of the stones, particularly as the epoxy layer is poured and dries.

What is claimed is:

1. A process for producing slabs having a pattern on one surface thereof formed by exposed surfaces of mosaic stones arranged in a predetermined pattern, said process comprising:
    (a) placing a spacer member upon a horizontal support surface;
    (b) positioning a flat wooden sheet of predetermined outline with the lower surface thereof resting upon said spacer member, the latter being contained entirely within said predetermined outline, the upper surface of said sheet lying in a horizontal plane a predetermined distance above said support surface;

(c) arranging a plurality of border stones in closely spaced succession about the entire perimeter of said wooden sheet, said border stones resting upon said support surface and extending to a substantially uniform height substantially flush with the upper surface of said wooden sheet;

(d) arranging a plurality of mosaic stones in a desired pattern closely spaced relation over substantially all of said wooden sheet upper surface and extending over the upper surfaces of said border stones, said mosaic stones being cut to a substantially uniform thickness and ground substantially flat on both sides said stones being placed with the surfaces thereof which are to form said exposed surfaces of the finished slab facing upwardly;

(e) pouring a first quantity of hardenable resin material in liquid state over said mosaic stones to fill all spaces therebetween, and to extend at least partly between said mosaic stones and said border stones and between the lower surfaces of said mosaic stones and said wooden sheet upper surface;

(f) allowing said resin to dry, thereby forming a unitary sheet of said mosaic and border stones and ssaid wooden sheet with said exposed surfaces of said mosaic stones facing upwardly between said spaces filled by said resin material (g) inverting said unitary sheet to place said lower surface of said wooden sheet in an upwardly facing direction, and placing it upon a horizontal support;

(h) filling the area over said upwardly facing lower surface of said wooden sheet bounded by said border stones with a second quantity of hardenable resin material substantialy to a plane defined by the edges of said border stones to form a continuous resin layer;

(i) allowing said resin layer to dry, thereby providing a unitary slab having one major surface of polished mosaic stones, and the opposite major surface of a continuous resin layer surrounded by said border stones with resin filling the spaces therebetween; and (j) polishing said exposed surface of said mosaic stones to provide a finish of desired smoothness and to remove all excess resin from said exposed surface.

2. The invention according to claim 1 wherein said wooden sheet is essentially impervious to moisture.

3. The invention according to claim 2 and including the further step of surrounding said border stones and the perimeter of said mosaic stones with retaining means effective to prevent said resin material from flowing outwardly substantially beyond said mosaic stone perimeter and the outer surfaces of said border stones, prior to pouring said resin material over said border stones.

4. The invention according to claim 3 and including the further step of polishing the exposed surfaces of said border stones after said resin layer has dried.

5. The invention according to claim 4 and comprising the further step of forming edge portions of at least some of said mosaic stones to provide an overlapping relation thereof when placed in adjacent relation on said wooden sheet.

6. The invention according to claim 1 wherein said resin material is a polyester resin.

7. The invention according to claim 6 wherein said resin material includes a pigment providing opacity and resistance to discoloration from ultraviolet rays.

8. The invention according to claim 7 wherein said wooden sheet is a slab of untreated, dense, substantially moisture-impervious wood.

9. The invention according to claim 8 wherein said natural wood is Jacaranda.

10. The invention according to claim 7 wherein said wooden sheet is a layer of wood which has been treated to render it substantially moisture-impervious.

* * * * *